July 17, 1962  H. SCHÖTTLER  3,044,345
ELECTRONIC INSPECTION APPARATUS FOR TEXTILE THREADS
Filed Aug. 15, 1957  3 Sheets-Sheet 1

INVENTOR
Helmut SCHÖTTLER

BY: Michael S. Striker
ATTORNEY

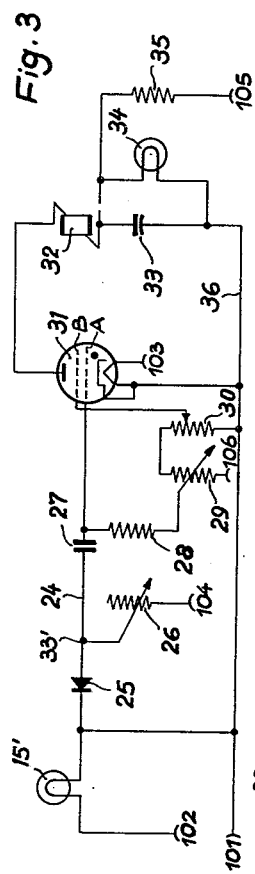
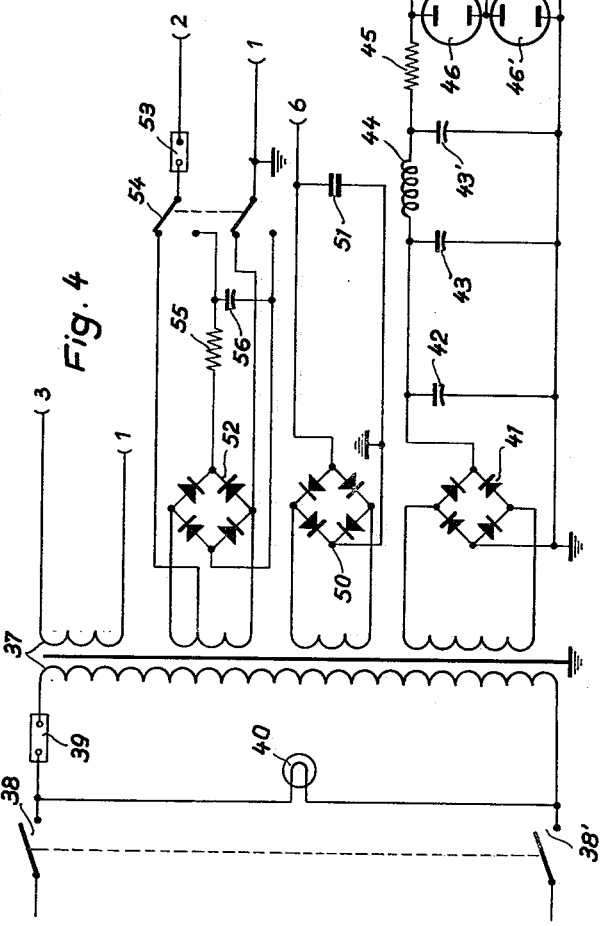

July 17, 1962     H. SCHÖTTLER     3,044,345
ELECTRONIC INSPECTION APPARATUS FOR TEXTILE THREADS
Filed Aug. 15, 1957     3 Sheets-Sheet 3

INVENTOR
Helmut SCHÖTTLER

BY: Michael A. Striker
ATTORNEY

United States Patent Office 3,044,345
Patented July 17, 1962

3,044,345
ELECTRONIC INSPECTION APPARATUS FOR TEXTILE THREADS
Helmut Schöttler, Neumunster, Germany, assignor to Phrix-Werke Aktiengesellschaft, Hamburg, Germany
Filed Aug. 15, 1957, Ser. No. 678,353
Claims priority, application Germany Aug. 16, 1956
5 Claims. (Cl. 88—14)

The present invention refers to testing and inspecting devices for textile threads, and more particularly to a device for counting loose fiber ends that may exist on textile threads after spinning.

These loose fiber ends occur on textile threads or yarns, for instance those made out of regenerated cellulose or entirely of synthetic material, due to breaking of individual strands or fibers thereof; it is of great importance to establish the existence of such loose fiber ends and to count them because the producer and later the processor of this thread material will assess the quality of the threads on the basis of the number of loose fiber ends occurring on a given length of thread.

Known equipment for establishing the existence of loose fiber ends and for counting their number have proven unsatisfactory for various reasons. Such known equipment of the electronic type is comparatively bulky and involved, chiefly due to the use of amplifier means. For that reason the known equipment is more or less only suitable to the use in a laboratory to test threads that have been previously manufactured. Conventional equipment of this type is ordinarily supplied from a power line and unfortunately occurring fluctuations of voltage in such power lines seriously affect the correctness of the indication of the equipment. If conventional means for evening out and rendering more uniform the voltage supplied from a power line is added to the conventional equipment, the aggregate installation becomes even more bulky.

It is therefore a main object of this invention to provide a device for testing textile threads for the existence of loose fiber ends and for counting their number in reference to a given length of that thread, said device being free of the drawbacks of conventional equipment.

It is another object of the invention to provide a device of the type set forth which would not require the use of an amplifier and would be independent of occurring voltage fluctuations in the power line.

It is still a further object of this invention to provide for a device of the type set forth which can be produced so as to occupy comparatively small space so that it can be installed directly on the spinning frame so that the threads can be tested and inspected for quality immediately as they are produced which is of great advantage because then the quality of the product can be assessed during the production process and does not have to be established subsequently in a separate laboratory test.

Other objects and advantages of the present invention will appear from the following specification.

With the above objects in view, an electronic inspection apparatus for indicating and counting loose fiber ends projecting from a textile thread which is passed through the apparatus, comprising, in combination, a source of light emitting rays of light; light stop means closely spaced from said source and extending across said rays of light, said light stop means having a single aperture determining a beam of light passing therethrough, the area of said aperture being dimensioned not to exceed ten times that fraction thereof which would be obstructed by one loose fiber end of predetermined thickness extending across said aperture; means for guiding a thread across said rays of light in close proximity to, but beside said aperture of said stop means so that the passage of said beam of light through said aperture is always unobstructed by said thread, while, on the other hand, loose fiber ends projecting from said thread are caused to pass over said aperture and temporarily obstruct said fraction of said area; control circuit means connected to a source of substantially constant electric potential and including a first and a second variable resistance means in series-connection, said first variable resistance means being a barrier-type photocell arranged across the path of said beam of light beyond said aperture for being exposed thereto and changing its resistance value in proportion to a variation of the illumination thereof produced by said beam of light, the sensitive area of said photocell illuminated by said beam of light not exceeding ten times said area of said aperture, a junction point between said two variable resistance means carrying a potential which varies with the variations of the voltage drop across said photocell depending on variations of its resistance value, the lower limit of said voltage drop being adjustable by said second variable resistance means; relay circuit means coupled with said junction point between said resistance means and capable of transmitting pulses in response to pulses derived from said variations of said potential at said junction point; counting means operable by said electrical pulses transmitted by said relay circuit means when the latter is actuated by pulses derived from said potential variations at said junction point caused by the passage of loose fiber ends across said aperture, every pulse counted representing the passage of one such loose fiber end; and power supply means including circuit means for energizing said relay circuit means and said counting means.

It has been found that most of the difficulties connected with the conventional equipment can be avoided if a barrier-type photocell is used in the device. By the selection of this particular type of a photocell the whole arrangement and circuit means become surprisingly simple and the operation in all its details is more suited to satisfy the requirements of the particular problem. The use of a barrier-type cell instead of any other type of photocell results not only in a much smaller space requirement for the device but above all the advantage that a given magnitude of the variation of light intensity causes a very strong electrical impulse which is capable of actuating a relay without any amplification. Therefore the usual amplifier means can be dispensed with, which has the further consequence that even if the power is derived from a conventional power line a sufficient stability or uniformity of operation of the device is assured so that erroneous or wrong counting is safely excluded. For the reasons stated a loose fiber ends counter according to the invention consists mainly only of a photoelectric generator, a relay unit and a power supply unit, the latter being greatly simplified because no amplification is needed. An arrangement of this type is entirely insensitive against disturbances or voltage fluctuations derived from the line and entirely reliable regarding the indication and the counting of occurring loose fiber ends.

In accordance with the above, the device according to the invention comprises as a light-sensitive element a barrier-type photocell which is only capacitively coupled with a relay circuit, while the supply of the source of light, the photocell and the relay circuit is carried out by a power supply unit which is common to all the just-mentioned devices. In a further development of the basic invention, a power supply means of the type mentioned can be used for feeding a plurality of devices, each comprising a source of light, an aperture stop, a barrier-type photocell, and a relay circuit. The arrangement may be such that the relay either consists in an electromechanical counting device, or is adapted to actuate such a counting device which may even be combined or supplemented by a cutting device, a motor switch or similar apparatus.

If the relay tube of the relay circuit is a thyratron with heated cathodes then it is advisable, as experiments have shown, to generate the bias potentials for this tube by a special rectifier, exclusively designed for this purpose, in other words, as a "separate" direct current potential whereby a detrimental instability of the relay circuit can be eliminated. It is another feature of the invention that the grids of this tube obtain different bias potentials whereby the capacity of this tube is utilized to a better degree.

According to the invention, the relay tube of the relay circuit may also be a cold cathode thyratron. In this case the advantage consists in the fact that the whole circuit requires less power input and the parts of the relays will not heat up as much as in the case of using a hot cathode tube, the life expectancy of the latter being also much smaller than that of a cold cathode tube. In the case of using a cold cathode thyratron the auxiliary anode bias potential of this tube is obtained from a special and separate rectifier circuit combined with electronic stabilization means.

In order to obtain a reliable indication of existing loose fiber ends the electric impulse transmitted to the grid of the relay tube of the relay circuit must be made as strong as possible. The impulse is created by a variation of light intensity on the surface of the photo-sensitive element, and the change in potential depends upon the relative variation of intensity of light. The larger the variation of light intensity, the greater is the variation of voltage or in other words the voltage impulse. The variation of light intensity on the photocell is actually caused by the shadow of a loose fiber end moving across the beam of light which passes through the aperture of the stop and reaches the photocell. It is possible to use a shield or stop with two small apertures spaced a very small distance from each other with the threads to be tested passing on one side of the shield between the two apertures so that projecting loose fiber ends will throw a shadow through one or the other of the two adjacent apertures. It has been found, however, that the use of an aperture stop having only one single small aperture is far superior in effect than the above-described device. If a thread is moved across the light beam in the space between two closely adjacent holes, then at a given instant when one projecting loose fiber end, that is a small single strand of fiber projecting toward one side of the thread passes through the light beam, only one or the other of the two apertures is temporarily wholly or partly obstructed. Therefore, the variation of light intensity can be calculated, roughly speaking, on the basis of the relative obstruction of one of the two holes versus the total light put through both holes together. However in the case of the use of only one aperture under otherwise similar circumstances, the variation of light intensity is evidently, again roughly speaking, the proportion of the obstruction of the one aperture versus the light put through that one aperture. Therefore the variation in light, percentagewise, is considerably larger in the case of the use of only one aperture.

Without any further consideration, it might appear likely that, statistically speaking, the possibility or probability of one of the two apertures being obstructed by passing loose fiber ends is as big as that one concerning the other one of the two holes. Surprisingly however it has been found and established by a great number of experiments that much depends upon the way in which the thread is guided in the neighborhood of the aperture in the stop or shield of the device. It will be shown further below that by properly guiding the threads the use of a second aperture would be actually detrimental while best effects are obtained by the use of one single aperture in connection with a proper guiding means. Therefore, according to the invention, an aperture stop is used having only one single, preferably circular, aperture located between the source of light and the photocell, and to use guide rods in such a manner for guiding the thread to be tested so that the thread travels along a line which is more or less tangent to the aperture or very close to the edge thereof, on that face of the stop or shield which faces the source of light. In case of guiding the thread in this particular manner, the projecting loose ends of single fibers or strands will always occupy a position in which they pass over the single aperture so as to temporarily obstruct the latter partly or wholly, but so that they never will pass over the shield without obstructing the aperture.

Preferably the barrier-type photocell is a germanium photo-diode which must have a sufficiently large photosensitive area in order to be illuminated by the light which passes through the aperture of the shield, and furthermore it must operate with such a potential that the voltage impulse which it transmits to the relay tube is large enough to control sufficiently the relay circuit. Particularly suitable for this purpose is for instance a photo-diode Siemens TP 50 which according to commercially available tables has a sensitive area of 1 mm.$^2$ This, in turn, permits to use as a source a lamp of comparatively low output, for instance of 2 watts instead of the usual 25 watt, which is also smaller in size. In addition, in view of the high sensitivity of the barrier-type cell in the spectral range of 1 to 2 $\mu$, a working potential of only 4 volts is required. This entails the advantage that the lamp has a long operational life and that the light-sensitive element is heated only to a small degree. Due to the high sensitivity of a barrier-type photocell even a collective lens between the source of light and the photocell can be dispensed with. The light travels in this case not as a concentrated beam from the source to the aperture stop or shield which has the further advantage that mechanical shocks or vibrations of the whole device do not cause a bouncing or dancing of the light beam on the surface of the shield which would easily cause wrong or erroneous counting operations.

The small dimensions of a barrier-type cell, for instance of a germanium photo-diode favorably affects the design of the device. For instance the source of light, the aperture stop and the photocell can be arranged in a comparatively small enclosure which can be easily mounted directly on a spinning machine or the like for continuous inspection and testing of the thread. Such a unit has approximately the same size as an ordinary photocell and may have for instance an outer diameter of approximately 25-30 mm. and a length of about 50-100 mm. A plurality of such units can be fed from a common power unit or power supply means which again can be accommodated together with the corresponding number of relay circuits in one housing which may be connected by one multistrand cable with the individual sensitive units.

In a preferred embodiment of the invention, however, the source of light, the aperture stop and the guide means for the thread, the barrier-type photocell and the entire relay unit comprising the relay tube and the electromechanical counter, are all comprised in one unit and a common power supply unit is provided for a plurality of the first-mentioned units. The close structural connection of the light-sensitive device and the counting device in accordance with the invention has the great advantage that the result of the counting operation can be observed and read directly where the apparatus carries out the testing operation, which again means a great simplification for the operation, particularly if it is taken into account that there may be up to 100 loose fiber ends counting devices arranged in a series one next to the other on one single textile machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a wiring diagram for a combined testing and relay unit according to FIG. 1;

FIG. 4 is a wiring diagram of the pertaining power supply units;

Figure 1:
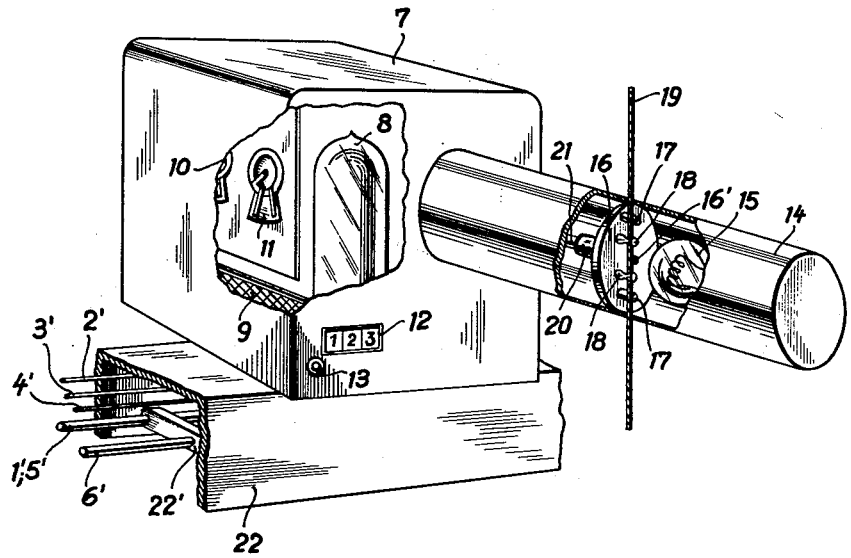
FIG. 1 is a diagrammatic perspective view of a complete apparatus or unit according to the invention, consisting of a testing unit and a relay unit, both mounted on a rail system containing the leads for the electric current supply, some portions of the above-mentioned parts being broken away for the purpose of showing the interior parts.

Referring now to FIG. 1, a housing 7 contains the various electrical elements and connections of the relay unit as indicated in detail in the wiring diagrams 3 and 5. FIG. 1 shows inside the housing the relay tube 8 which may be a hot cathode thyratron or a cold cathode relay tube, moreover the electromagnetic counter 9 the indications of which are shown in a window 12 of the housing 7 by means of figures that are directly readable. A button 13 serves to reset mechanically the counter to zero.

The numerals 10 and 11 indicate control means which are described and explained more in detail in connection with the wiring diagram. Other control means forming part of the relay circuit are not shown in FIG. 1 since they are hidden within the housing 7.

A tubular member 14 is detachably connected, and preferably slidably mounted in a corresponding opening of one wall of the housing 7. In this manner the tubular member 14 constitutes a structural unit with the housing 7 and contains the testing unit of the device. FIG. 1 shows the location of a source of light 15 which may be an electrical bulb of 2 watts and operating on 6 volts, it further shows a shield or aperture stop consisting in this example of a round disc 16 which has in its center a small aperture 16'. For guiding a thread 19 to be tested over the shield 16 and across the light beam passing from the source 15 to the aperture 16' two pin-shaped guide elements 17 are mounted on the disc 16 facing towards the lamp 15 and located opposite to each other at remote points from the aperture 16' but along a line which passes approximately by the one edge of the aperture 16'. Two inner guide elements 18 are mounted similarly on the shield or disc 16 but closer to the aperture 16'. These guide pins 18 have, in this example, a sort of waistline and pointed tips. Details of the guide means will be explained in reference to FIG. 2 further below. Located on the remote side of the shield 16 is the barrier-type photocell 20 which is connected by a cable 21 with the electrical elements inside the housing 7. It should be understood that the tubular member 14 is provided with a lateral slot, not shown in FIG. 1, but located in the area of the disc 16 so that the thread 19 can be inserted in transverse direction so as to engage the guide means 17 and 18 in the manner described further below.

FIG. 1 further illustrates a portion of a channel-shaped rail member 22 which serves to support the housing 7 with its attached tubular member 14, in other words which supports the whole structural unit comprising both the test unit and the relay unit and which may be connected with the housing 7 by holding or clamping means not illustrated. It has to be understood that the rail member 22 may extend over any desired length and may be attached to a textile machine, for instance a spinning frame, so that a plurality of structural units of the same type and nature as the ones described above would be carried by such a rail member 22 in a series, the individual units being spaced from each other in accordance with the corresponding spacing of the individual spinning units of the spinning machine. Within the channel or rail member 22 are arranged all the supply lines 1', 5' (a two-wire cable), 2', 3', 4', and 6' which are connected at one end to the terminals 1, 5, 2, 3, 4, and 6 of the power supply unit shown in FIG. 4, or, respectively, the corresponding terminals 1" to 6" of the power supply means according to FIG. 6. Each relay and test unit having terminals 101 to 106 (FIG. 3) or 101' to 106' (FIG. 5) may be provided with corresponding leads from these terminals to a six-prong plug which, in turn, may be plugged into a corresponding six-hole socket connected accordingly with the above-mentioned cables or supply lines 1'–6'. The various leads or cables within the channel-shaped rail 22 may be held there in position by cross pieces 22' as one of them is shown diagrammatically in FIG. 1.

Figure 2:
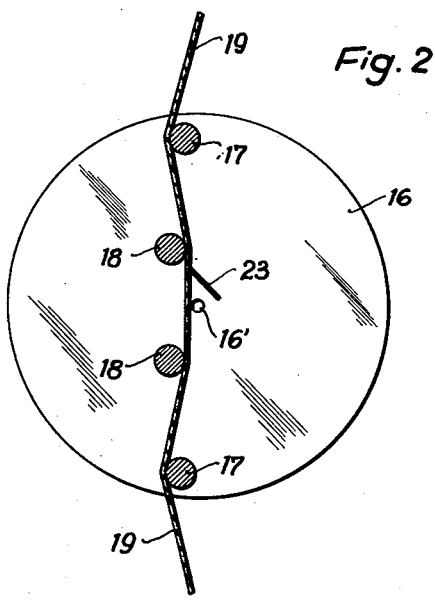
FIG. 2 is a diagrammatic plan view of a shield as used in the device shown in FIG. 1, including guide elements shown in section.

FIG. 2 shows at a larger scale the shield or aperture stop 16 together with the guide means for the thread to be tested. A circular disc 16 is provided in this example with a small circular aperture 16' in its center, and two outer guide pins 17 and two inner guide pins 18 are shown in their relative position and in cross section. The FIG. 2 further shows how the thread 19 is guided by the guide pins 17 and 18. It can be seen that one portion of the thread is guided along a short straight path proximately to the aperture 16', and in this particular example along a line which is substantially a tangent to one edge of the aperture 16'. It can be seen further that the thread 19 engages the left edge of the one outer pin 17 and proceeds to engage the right-hand edge of the following pin 18 and continues in the reversed sequence of these two engagements across the shield 16. In this manner the thread 19 which is moved under certain tension across the device is forced to undergo slight bends as it proceeds consecutively from one guide pin to the next one. This serves a very special purpose, namely to maintain a certain amount of tension in the thread while it passes through the guide means and, as experiments have shown to assure that any existing loose fiber ends automatically turn on account of being guided in the manner shown, in the direction in which a broken fiber end or strand 23, as shown in FIG. 2, will extend over the aperture 16' while the thread is moving across the shield 16. It should be noted that this peculiar effect of all the loose fiber ends turning towards the aperture 16' is only obtainable if all the guide pins are located on one side of the imaginary line or diameter drawn through the aperture 16' and if the tension of the thread is maintained in the manner shown. If the aperture were located, as seen in FIG. 2, to the left of a line connecting the two inner guide pins 18, then the loose fiber ends would never obscure the aperture 16' because in the arrangement as shown the loose fiber ends 23 always point away from the inner guides 18.

It should be understood, that the arrangement as shown in FIG. 2 is only one possibility of arranging the guide means and guiding the thread through the device, and any other means that would make sure that existing loose fiber ends are guided over the aperture 16' would be equivalent and still within the scope of the present invention.

The selection of a shield having only one single aperture in accordance with the invention entails the advantage that the relative variation of the intensity of light is twice as large as if a second aperture were used which as has been explained above would not participate in the detection of existing loose fiber ends, however it would throw some extra light on the photo-electric cell so that the obstruction caused by a loose fiber end would have to be calculated in proportion to the total amount of light passing through two apertures. In addition it has to be borne in mind also that the sensitive area of barrier-type photocells is usually so small that they can be set up and adjusted for the best possible performance only in cooperation with a small single aperture in the shield.

The magnitude of the aperture has some significance and importance. The thinner and finer the projecting capillary fiber ends, strands or fibers of the thread are, the smaller should be the diameter of the aperture in order to be sure that the relative variation of the intensity of light hitting the photocell is as large as possible. On the other hand, of course, the size of the aperture cannot be reduced beyond practical limits. It may be stated, that an aperture of less than .4 mm., for instance .36 mm. is very well suited for detecting the finest occurring capillary fibers ends.

It should be clear from the above, that by the use of a single aperture shield with the smallest possible hole diameter a comparatively large relative change in intensity of light can be obtained which on the other hand is the condition for generating the largest possible potential impulse in the thyratron of the relay circuit of the device which results in the greatest imaginable efficiency and accuracy of the indication and count of loose fiber ends on a textile thread.

Another important factor in this connection is the condition that the greatest possible change in the intensity of light received by the photocell is converted by the barrier-type cell in the largest possible change in voltage; for this purpose, in accordance with the invention, the photo-diode is connected in series with a variable resistor (26 in FIGS. 3 and 5) which will be explained in its function further below.

FIGS. 3 and 4 illustrate one embodiment of the invention regarding the electrical means for converting the impulses of light or changes of light intensity into corresponding indications. FIG. 3 in particular is a wiring diagram for a combined test and relay unit which according to the invention can be united structurally into one unit. As mentioned above, a great plurality of such structural units, for instance hundreds of them, may be provided in connection with one textile machine. Common to all of them is a power supply unit, the wiring diagram of which is illustrated by FIG. 4.

As shown in FIG. 3, a six-volt, 2 watt bulb 15' is connected on one side to a terminal 102 and on the other side through a connection 24 to a germanium photo-diode 25 (type Siemens TP 50). In a branch emanating from line 24 at the point 33' is a variable resistor 26, adjustable between 0 and 1 MΩ and connected to a terminal 104. Connected in line 24 is further a condenser 27 of 400 micromicrofarad, which is connected in series with the fixed resistance 28 having 2.5 MΩ and a variable resistor 29, adjustable between 0 and 10 KΩ and further with a terminal 106. The other end of resistor 29 is connected to one end of a resistor 30 of 5 KΩ from where a connection goes to one grid of a gas-filled relay tube 31 the second grid whereof is connected to the end of the line 24. Connected in the anode circuit of the thyratron 31 is a relay comprised by an electromagnetic counter 32 which is connected with a charging condenser 33 of 8 μf. which is connected in parallel with a glow discharge tube 34, which in turn is connected at one end with a resistor 35 of 160 KΩ and a terminal 105, while the other side of said glow discharge tube is connected to a line 36 which leads to a terminal 101 and which is connected with the not yet mentioned end of the resistor 30 and with the cathode of the tube 31.

To explain the operation of this circuit, it should be understood that the terminal 101 is grounded so it carries a potential of 0 volts, the terminal 102 carries an A.C. potential for the bulb 15'. A D.C. potential of +50 volts is applied to the terminal 104. Now if the intensity of light illuminating the barrier-type cell 25 is cut down temporarily a positive voltage impulse is generated at the point 33' which then through the coupling condenser 27 reaches the grid A of the tube 31 which causes the latter to ignite. Between ground and the terminal 106 there is a negative D.C. potential of 6 volts which is divided by the voltage divider arrangement 29, 30 into the potentials required by the grids A and B. By means of the variable resistor 29, which is practically identical with the control means 10 shown in FIG. 1, the biasing potential for the grid A can be adjusted, the resistor 28 functioning as an auxiliary resistor for the grid. The resistor 30 is also adjustable and serves for individually adjusting the potential of grid B for each individual tube. For heating the cathode of the tube 31 an A.C. potential of 6.3 volts is applied to the terminal 103. The anode potential of +300 volts D.C. is applied to the terminal 105. The electrolytic condenser 33 of 8 μf. is charged via the charging resistor 35 of 160 KΩ. The glow discharge lamp or tube 34 indicates that the condenser is in charged condition. When the tube ignites the condenser discharges via the counter and the tube: therefore the counter moves one step forward. The tube is extinguished the moment the condenser discharges. Of course, the latter has to be recharged again after this in order to be ready for the next cycle of operation. The time between one discharge and a complete recharge via the resistor 35 is approximately .5 to 1 second. During this period of recharging no counting operation can be carried out. This means that with a traveling speed of the thread of about 200 meters per minute it is only possible to make one count for each length of thread amounting to 2 to 3 meters length. By increasing or reducing the charging resistance and the condenser, i.e. the RC-element, this time interval can be increased or reduced.

As has been stated above a D.C. potential of 50 volts is applied to the photo-diode 25 and the variable resistor 26. This potential is to be measured at the point 33' as compared with ground potential and then the resistance 26 is adjusted by means of the control means 11, FIG. 1, in such a manner that the voltage is brought to a value of almost zero, for instance .5 volts. While the barrier-type photocell is illuminated, its inner resistance is very small, therefore the potential across the cell is only a small fraction of the 50 volts. When, however, a loose fiber end passes across the shield aperture i.e. when the photocell is partially darkened, then instantaneously the inner resistance of the cell increases to such an extent that now the voltage across the cell is almost 50 volts. As soon as the loose fiber end has passed, again the voltage across the cell drops to a fraction of the said 50 volts. It is evident that this momentary change of potential, in other words this voltage impulse, is the greater, the closer the potential across the cell during its being illuminated is to zero and the closer this potential is to 50 volts while the cell is not exposed to full illumination. In order to obtain these most favourable conditions, it is advisable to make the absolute intensity of light on the barrier-type photocell as large as possible, with the understanding that this maximum obtainable light intensity corresponds to a certain most favorable magnitude of the outer resistance 26 which, as was mentioned, is to be adjusted in such a manner that when the cell is illuminated, the potential across the cell is almost zero, for instance .5 volts. This is the reason why according to the invention the resistor 26 which is in series with the barrier-type photocell, is variable so that its magnitude can be adjusted in the manner set forth above. It must be borne in mind however that this potential must not be equal to zero. Assuming the resistance value of the outer resistor 26 is called RA and the corresponding large potential across the photocell is called UD, then it has to be stated that if the resistance of the outer resistor 26 starting from a small value RA and a corresponding large value UD is increased beyond a value RA corresponding to UD equal to zero, then UD cannot change any more. If now under these circumstances the density of illumination would be changed by a small amount, the potential UD at the photocell would further remain at zero in other words there would be no voltage impulse. In order to avoid this it is absolutely necessary to maintain across the barrier-type photocell also during its illuminated state a finite, though very small potential.

As has been stated above, the aperture of the shield, or in this example the diameter of the circular hole 16' should be as small as possible. If it is nevertheless intended to arrive at a sufficient intensity of illumination on the photocell then it is necessary to mount the latter precisely behind the aperture in the shield. On the other hand as much light as possible has to be radiated against the shield which is for practical purposes only possible to obtain by mounting the source of light as closely as possible to the shield. An increase of light intensity by forming a condensed beam of light optically is not of advantage because vibrations or shock would affect the direction of the beam and may lead to wrong indications. Also it is not possible for practical reasons to increase the output of the bulb because bulbs of larger output would unnecessarily heat up the photocell. However if a barrier-type photocell is heated up then its resistivity in not illuminated state decreases that means that a larger current flows to the cell when it is not illuminated and therefore less than the total amount of 50 volts would constitute the potential across the cell under these circumstances, which would cause a smaller voltage impulse. Therefore it is advisable to use small bulbs which have a capacity of not more than 2 watts.

When a loose or projecting fiber end shows up and passes across the opening of the shield, then as explained above a positive voltage impulse is generated at the point 33' which impulse would have the maximum possible strength if the above-described conditions are met. This impulse is then transmitted by the condenser 27 or 400 micromicrofarad to one grid of the thyratron 31 which causes the counting device 52 located in the anode circuit of the thyratron to respond.

A power supply unit according to FIG. 4 comprises a transformer 37 the primary coil of which may be supplied for instance with a 220 volt A.C. A double pole switch 38, 38' serves for switching on the device. The fuse 39 may be provided on the primary side and a glow discharge tube 40 may be connected across the two terminals of the transformer in order to indicate whether it is operating. On the secondary side this transformer furnishes an A.C. of 6.3 volts and 5 amps; 46 volts and 7 amps; 6 volts and 100 ma.; 300 volts and 150 ma. The last-mentioned voltage of 300 volts is rectified by means of the selenium rectifier arrangement 41. Connected to the output side of the rectifier 41 is a bandpass filter comprising a condenser 42 of 32 µf., two condensers 43 and 43' having each 32 µf., and a choke coil 44 of 10 h. This system is followed by a resistor 45 of 4 KΩ, two stabilizer tubes 46, 46' (type 150 C 2) and a ignition resistance 45' of 100 KΩ and finally a voltage divider arrangement 47, 48 with resistances of 10 KΩ and 50 KΩ, respectively. Between the terminals 1 and 4 of this device is a condenser 49 of 10 µf. which is supposed to dampen the reaction of possible voltage pulsations that might be caused by the operation of one counter unit and transmitted to other units which are not counting at the moment. It is not unlikely that without the use of this condenser wrong counts might be obtained.

Terminal 4 be connected to terminal 104 of FIG. 3: 50 volts of positive D.C. potential are furnished to the photo-diode 25, while terminal 5 be connected to terminal 105, 300 volts of positive potential are furnished as anode potential to the tube 31. By means of a separate rectifier arrangement 50 which is connected to the terminal 6, a D.C. potential of 6 volts, independent of the above-mentioned 300 volts D.C., is furnished as biasing potential to the tube 31 to the terminal 106, a condenser 51 of 16 µf. being provided for smoothing out the current.

Terminal 3 being connected to the terminal 103 serves to furnish 6.3 volts A.C. for heating the tube 31. The terminals 1 and 101, and terminals 2 and 102, respectively being connected, the lamp 15' can be supplied selectively, by means of the switch 54, either with 6 volts D.C. from the rectifier 52 or with A.C. from terminal 2. Experiments have shown that for most reliable operation of this device the use of D.C. is preferable. The terminals 2 and 1 serve to furnish either a D.C. or an A.C., both of 6 volts. The circuit is protected by a 6 amp fuse 53 against overload. A filtering arrangement consisting of a resistor 55 of 1.25 Ω and a condenser 56 of 1,000 µf. serve to smooth out the D.C. voltage.

Figure 5:
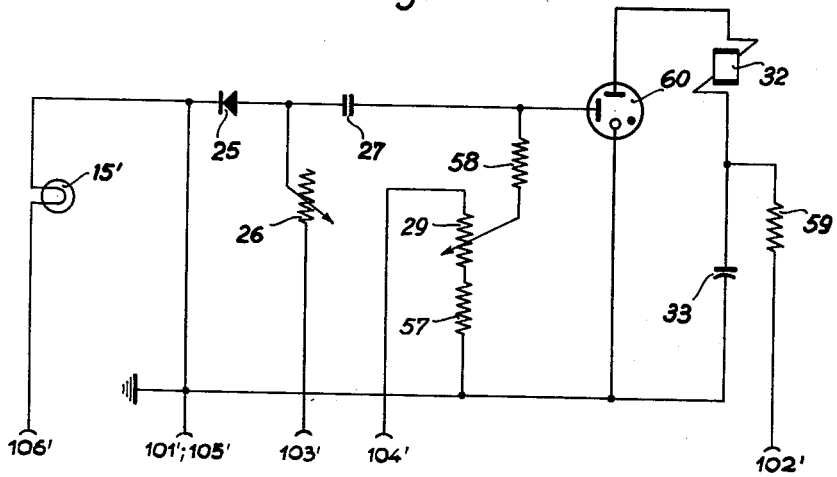
FIG. 5 is a wiring diagram of a modified version of the combined testing and relay unit.
Figure 6:
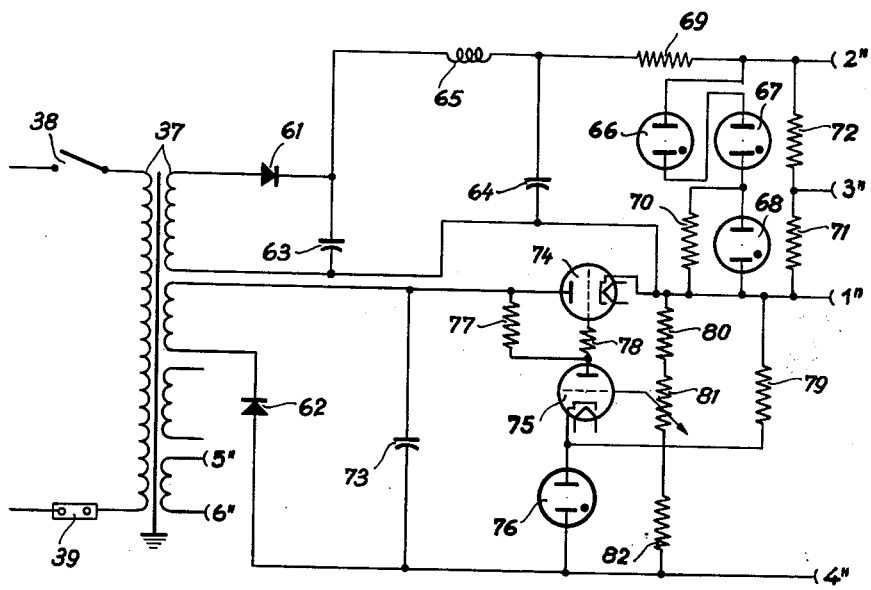
FIG. 6 is a wiring diagram of the pertaining power supply unit.

Referring now to FIGS. 5 and 6, a modified wiring system for use in connection with the device according to the invention is described. FIG. 5 is a diagram for the combined testing and relay unit, being the counterpart of FIG. 3, in this case, however, a cold-cathode tube being used instead of a hot-cathode relay tube. FIG. 6 is the diagram for the pertaining power supply unit adapted to serve a plurality of relay and testing units. Generally those elements of these diagrams which are identical with those shown in FIGS. 3 and 4 are designated by the same reference numerals.

FIG. 5 shows a number of terminals 101' to 106' which are intended to be connected correspondingly to the respective terminals 1'' to 6'', respectively, of the power supply unit according to the FIG. 6. The terminal 101', 105' is connected to ground; the terminal 102' is supplied with 300 volts positive D.C. voltage and the terminal 103' is supplied with 50 volts positive D.C. voltage while the terminal 104' is supplied with negative D.C. potential of 100 to 250 volts and terminal 106' is supplied with six volts A.C. The terminal 101', 105' is connected to the germanium photo-diode 25 (type Siemens TP 50). A variable outer resistor 26 of 1 MΩ, corresponding to the variable resistor 26 of FIG. 3, controlled by the controlled means 11 of FIG. 1, is connected in series with the diode 25. The potential across the last two mentioned elements is applied at the terminal 103' and is a positive D.C. potential of 50 volts. A negative D.C. potential of 150 volts is supplied to the terminal 104'. Two resistors 29 and 57 having 10 KΩ and 100 KΩ, respectively, the first of which corresponds to the resistor 29 of FIG. 3 and is variable (control means 10 in FIG. 1), serve as voltage dividers. By means of the variable resistor 29 of 10 KΩ the required auxiliary biasing potential for the relay tube can be adjusted accuartely by means of the control device 10 of FIG. 1. This last-mentioned potential may be negative in the amount of 140 volts so that the tube is in a condition very close to automatic ignition. A resistor 58 of 3 MΩ serves as a protective resistance in the auxiliary anode potential circuit.

A positive D.C. potential of 300 volts is applied to the terminal 102' and serves to recharge the condenser 33 of 8 µf. via a resistance 59 of 100 KΩ, whenever the condenser has been partially discharged through the counter 32 and the tube 60 after the relay tube 60 was ignited. In this case a gas-filled cold cathode relay tube is used in this arrangement, and it has been found that a relay tube of the type G 804 U of the Valvo Company is very well suited for this device. A substantial negative bias potential is applied to its auxiliary anode, namely approximately 140 volts and this anode is coupled via a coupling condenser 27 of 400 micromicrofarad with the center tap of the series resistor 26 belonging to the photo-diode 25.

Whenever a loose fiber end appears in front of the aperture 16' then the illumination of the photo-diode is cut out momentarily, for instance through a time interval of .0001 to .0002 seconds. Consequently the resistivity of the photo-diode temporarily increases very much.

Therefore, at the junction point between the photo-diode 25 and the resistance 26 a positive voltage impulse of between approximately 1 and 10 volts is generated. This impulse is then transmitted via the coupling condenser 27 of 400 micromicrofarad to the auxiliary anode of the relay tube 60 which is thereby made more positive temporarily so as to cause ignition. The ignited tube then extends the very short impulse to such a duration that the relay, counting device or the like can respond to it. In the present case an electromagnetic counter 32 would move one step forward with every such impulse. As soon as the condenser 33 of 8 μf. has transmitted its charge to the extent that the anode voltage drops to a value which is lower than the arc potential of the relay tube, the ignition extinguishes and the cycle may be started again.

FIG. 6 is a wiring diagram for a power supply unit which could be used for furnishing power for up to 200 units built according to the diagram of FIG. 5. In FIG. 6, a transformer 37 is shown which is connected on the primary side with 220 volts A.C. By means of a switch 38 the transformer can be switched on and off. The fuse 39 is provided for protection. On the secondary side two coils for furnishing 300 volts A.C. each are provided. Each of these two supplies of A.C. are connected with dry rectifiers 61 and 62, respectively. It is evident, that the rectifier 61 furnishes a slightly undulating positive D.C. potential. The latter is smoothed out by electrolytic condensers 63, 64 (6 μf. and 50 μf. respectively) and a choke coil 65 of 6 h. This smoothened D.C. voltage still has to be stabilized which is done by three gas-filled stabilizer tubes 66, 67, 68 (type 100 E FIG. 1). A resistor 69 of 300 Ω serves as series resistance, while a parallel resistance 70 of 100 KΩ connected in parallel with the tube 68 serves as an igniting resistance. The above-described means for stabilizing results in the fact that the voltage is maintained constant within plus and minus 5%. By means of a voltage divider 71, 72 of 5 KΩ and 25 KΩ, respectively, the D.C. for the barrier-type photocell 25 (FIG. 5) or 20 (FIG. 1) in the magnitude of 50 volts positive can be furnished via the terminal 3″, while the terminal 2″ will furnish the positive D.C. potential of 300 volts for the anode of the relay tube 60.

The remaining part of the diagram shows electronic stabilizing means which are required in this arrangement because the auxiliary anode bias potential must be very well stabilized. The rectified potential obtained from the dry rectifier 62 is smoothened out by condenser 73 having 50 μf. and is then transmitted to the stabilizer circuit. This latter circuit comprises in the illustrated example an output tube 75 (type EL 34), but two of these tubes could be used as well instead of the one. The circuit further comprises an amplifier tube 75 (type EP 80) and a gas-filled stabilizer tube 76 (type 85 A 1) with very close range of stabilization. As soon as this potential is increased, a corresponding increase of potential will be noticeable at the terminal 4″ whereby the control grid of the tube 75 will be made more positive. Hereby the resistance of the tube is reduced so that the voltage at the anode and therefore also the voltage at the grid of the tube 74 drops. On account of the increased negative bias potential of the control grid of the output tube 74 the inner resistance thereof increases whereby the original voltage is brought back to its original value. A resistor 77 of 600 KΩ serves as an anode resistance for the tube 75, while a resistor 78 of 20 KΩ is the grid resistance of the tube or tubes 75. The stabilizer tube 76 maintains the cathode potential of the control tube at a fixed level. The resistor 79 of 10 KΩ is a series resistance for the tube 76. The resistances 80, 81, 82 or 130 KΩ, 25 KΩ, (variable) and 260 KΩ, respectively, serve as voltage dividers.

A negative D.C. potential of approximately 100 to 250 volts, preferably 150 volts, can be furnished at the terminal 4″, said potential being stabilized to within .05 volt differential.

The loose fiber end indicating and counting device operates by means of the above-described electrical circuit and mechanical means at a velocity of the thread between 100 and 1,000 meters per minute. Within this speed range the actual speed used has practically no effect on the sensitivity of the measuring device. The sensitivity is such that for instance projecting capillary fibers of a thread of the type 60/14 denier are counted repeatedly with perfectly reliable and repeatable results.

For the purpose of testing the efficiency of the testing and counting device according to this invention, one particular length of thread (Polycaprolactam synthetic thread of total gauge of 45 denier and composed of 10 filaments) was passed consecutively through various selected pairs of devices according to FIG. 1 out of a total series of 10 devices. As soon as one particular device, namely the first of the series which was used as a comparison device, had arrived at a count of 100 the experiment was stopped, the count of the second device of the respective pair was read, and the experiment repeated with a different device paired with No. 1 (it is not possible to run one particular thread at the same time through more than two of the devices because the frictional resistance would be too great).

The following chart shows the results:

| Device No. | 1 | 2 | 3 | 4 | 5 | 6 | 7 | 8 | 9 | 10 |
|---|---|---|---|---|---|---|---|---|---|---|
| Loose fiber ends | 100 | 99 | 96 | 100 | 100 | 95 | 100 | 100 | 100 | 100 |

It can be seen that the greatest deviation from the correct figure is 5%. Therefore, it can be assumed that the accuracy of the device is within 3% in either direction.

It is evident that the arrangements and wiring systems according to FIGS. 3 and 4, 5 and 6, respectively, might as well be used in a device designed for use in a laboratory in which case only on testing and relay unit (FIG. 3 or 5) is used which may be accommodated in one common housing which, if desired, could even contain the power supply unit and the connection to the line.

It will be understood that each of the elements described above, or two or more together, may also find a useful application in other types of indicating devices differing from the types described above.

While the invention has been illustrated and described as embodied in electronic loose fiber ends indicating and counting deivces, it is not intended to be limited to the details shown, since various modifications and structural changes may be made with departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Electronic inspection apparatus for indicating and counting loose fiber ends projecting from a textile thread which is passed through the apparatus, comprising, in combination, a source of light emitting rays of light; light stop means closely spaced from said source and extending across said rays of light, said light stop means having a single aperture determining a beam of light passing therethrough, the area of said aperture being dimensioned not to exceed ten times that fraction thereof which would be obstructed by one loose fiber end of predetermined thickness extending across said aperture; means for guiding a thread across said rays of light in close proximity to, but beside said aperture of said stop means so that the passage of said beam of light through said aperture is always unobstructed by said thread, while, on the other hand, loose fiber ends projecting from said thread are caused to pass over said aperture and temporarily obstruct said fraction of said area; control circuit means connected to a source of substantially constant electric potential and including a first and a second variable resistance means in series-connection, said first variable resistance means being a barrier-type photocell arranged across the path of said beam of light beyond said aperture for being exposed thereto and changing its resistance value in proportion to a variation of the illumination thereof produced by said beam of light, the sensitive area of said photocell illuminated by said beam of light not exceeding ten times said area of said aperture, a junction point between said two variable resistance means carrying a potential which varies with the variations of the voltage drop across said photocell depending on variations of its resistance value, the lower limit of said voltage drop being adjustable by said second variable resistance means; relay circuit means coupled with said junction point between said resistance means and capable of transmitting pulses in response to pulses derived from said variations of said potential at said junction point; counting means operable by said electrical pulses transmitted by said relay circuit means when the latter is actuated by pulses derived from said potential variations at said junction point caused by the passage of loose fiber ends across said aperture, every pulse counted representing the passage of one such loose fiber end; and power supply means including circuit means for energizing said relay circuit means and said counting means.

2. Electronic inspection apparatus for indicating and counting loose fiber ends projecting from a textile thread which is passed through the apparatus, comprising, in combination, a source of light emitting rays of light; light stop means closely spaced from said source and extending across said rays of light, said light stop means having a single aperture determining a beam of light passing therethrough, the area of said aperture being dimensioned not to exceed ten times that fraction thereof which would be obstructed by one loose fiber end of predetermined thickness extending across said aperture; means for guiding a thread across said rays of light in close proximity to, but beside said aperture of said stop means so that the passage of said beam of light through said aperture is always unobstructed by said thread, while, on the other hand, loose fiber ends projecting from said thread are caused to pass over said aperture and temporarily obstruct said fraction of said area; control circuit means connected to a source of substantially constant electric potential and including a first and a second variable resistance means in series-connection, said first variable resistance means being a germanium photo-diode arranged across the path of said beam of light beyond said aperture for being exposed thereto and changing its resistance value in proportion to a variation of the illumination thereof produced by said beam of light, the sensitive area of said diode illuminated by said beam of light not exceeding ten times said area of said aperture, a junction point between said variable resistance means carrying a potential which varies with the variations of the voltage drop across said diode depending on variations of its resistance value, the lower limit of said voltage drop being adjustable by said second variable resistance means; relay circuit means coupled with said junction point between said two resistance means and capable of transmitting pulses in response to pulses derived from said variations of said potential at said junction point; counting means operable by said electrical pulses transmitted by said relay circuit means when the latter is actuated by pulses derived from said potential variations at said junction point caused by the passage of loose fiber ends across said aperture, every pulse counted representing the passage of one such loose fiber end; and power supply means including circuit means for energizing said relay circuit means and said counting means.

3. Electronic inspection apparatus for indicating and counting loose fiber ends projecting from a textile thread which is passed through the apparatus, comprising, in combination, a source of light emitting rays of light; light stop means closely spaced from said source and extending across said rays of light, said light stop means having a single aperture determining a beam of light passing therethrough, the area of said aperture being dimensioned not to exceed ten times that fraction thereof which would be obstructed by one loose fiber end of predetermined thickness extending across said aperture; means for guiding a thread across said rays of light in close proximity to, but beside said aperture of said stop means so that the passage of said beam of light through said aperture is always unobstructed by said thread, while, on the other hand, loose fiber ends projecting from said thread are caused to pass over said aperture and temporarily obstruct said fraction of said area; control circuit means connected to a source of substantially constant electric potential and including a first and a second variable resistance means in series-connection, said first variable resistance means being a germanium photo-diode arranged across the path of said beam of light beyond said aperture for being exposed thereto and changing its resistance value in proportion to a variation of the illumination thereof produced by said beam of light, the sensitive area of said diode illuminated by said beam of light not exceeding ten times said area of said aperture, a junction point between said two variable resistance means carrying a potential which varies with the variations of the voltage drop across said diode depending on variations of its resistance value, the lower limit of said voltage drop being adjustable by said second variable resistance means; relay circuit means including relay tube means only capacitively coupled with said junction point between said resistance means and capable of transmitting pulses in response to pulses derived from said variations of said potential at said junction point; counting means operable by said electrical pulses transmitted by said relay circuit means when the latter is actuated by pulses derived from said potential variations at said junction point caused by the passage of loose fiber ends across said aperture, every pulse counted representing the passage of one such loose fiber end; and power supply means including circuit means for energizing said relay circuit means and said counting means.

4. Electronic inspection apparatus for indicating and counting loose fiber ends projecting from a textile thread which is passed through the apparatus, comprising, in combination, a source of light emitting rays of light; light stop means closely spaced from said source and extending across said rays of light, said light stop means having a single aperture determining a beam of light passing therethrough, the area of said aperture being dimensioned not to exceed ten times that fraction thereof which would be obstructed by one loose fiber end of predetermined thickness extending across said aperture; means for guiding a thread across said rays of light in close proximitiy to, but beside aperture of said stop means so that the passage of said beam of light through said aperture is always unobstructed by said thread, while, on the other hand, loose fiber ends projecting from said thread are caused to pass over said aperture and temporarily obstruct said fraction of said area; control circuit means connected to a source of substantially constant electric potential and including a first and a second variable resistance means in series-connection, said first variable resistance means being a germanium photo-diode arranged across the path of said beam of light beyond said aperture for being exposed thereto and changing its resistance value in proportion to a variation of the illumination thereof produced by said beam of light, the sensitive area of said diode illuminated by said beam of light not exceeding ten times said area of said aperture, a junction point between said two variable resistance means carrying a potential which varies with the variations of the voltage drop across said diode depending on variations of its resistance value, the lower limit of said voltage drop being adjustable by said second variable resistance means; relay circuit means including a hot-cathode thyratron having at least one control grid only capacitively coupled with said junction point between said resistance means and capable of transmitting pulses in response to pulses derived from said variations of said potential at said junction point and applied to said control grid, counting means operable by said electrical pulses transmitted by said relay circuit means when the latter is actuated by pulses derived from said potential variations at said junction point caused by the passage of loose fiber ends across said aperture, every pulse counted representing the passage of one such loose fiber end; and power supply means including circuit means for energizing said relay circuit means and said counting means.

5. Electronic inspection apparatus for indicating and counting loose fiber ends projecting from a textile thread which is passed through the apparatus, comprising, in combination, a source of light emitting rays of light; light stop means closely spaced from said source and extending across said rays of light, said light stop means having a single aperture determining a beam of light passing therethrough, the area of said aperture being dimensioned not to exceed ten times that fraction thereof which would be obstructed by one loose fiber end of predetermined thickness extending across said aperture; means for guiding a thread across said rays of light in close proximity to, but beside said aperture of said stop means so that the passage of said beam of light through said aperture is always unobstructed by said thread, while, on the other hand, loose fiber ends projecting from said thread are caused to pass over said aperture and temporarily obstruct said fraction of said area; control circuit means connected to a source of substantially constant electric potential and including a first and a second variable resistance means being a germanium photo-diode arranged across the path of said beam of light beyond said aperture for being exposed thereto and changing its resistance value in proportion to a variation of the illumination thereof produced by said beam of light, the sensitive area of said diode illuminated by said beam of light not exceeding ten times said area of said aperture, a junction point between said two variable resistance means carrying a potential which varies with the variations of the voltage drop across said diode depending on variations of its resistance value, the lower limit of said voltage drop being adjustable by said second variable resistance means; relay circuit means including a cold-cathode tube having a control electrode only capacitively coupled with said junction point between said resistance means and capable of transmitting pulses in response to pulses derived from said variations of said potential at said junction point and applied to said control electrode; counting means operable by said electrical pulses transmitted by said relay circuit means when the latter is actuated by pulses derived from said potential variations at said junction point caused by the passage of loose fiber ends across said aperture, every pulse counted representing the passage of one such loose fiber end; and power supply means including circuit means for energizing said relay circuit means and said counting means.

References Cited in the file of this patent

UNITED STATES PATENTS

| | | |
|---|---|---|
| 1,965,373 | Fitzgerald | July 3, 1934 |
| 2,367,958 | Michaelson | Jan. 23, 1945 |
| 2,413,486 | Denyssen | Dec. 31, 1946 |
| 2,510,347 | Perkins | June 6, 1950 |
| 2,670,650 | Wilmotte | Mar. 2, 1954 |

FOREIGN PATENTS

| | | |
|---|---|---|
| 202,010 | Australia | May 30, 1956 |
| 691,491 | Great Britain | May 13, 1953 |